United States Patent
Guo et al.

(10) Patent No.: US 11,842,139 B1
(45) Date of Patent: Dec. 12, 2023

(54) METHOD AND APPARATUS FOR CALCULATING EQUAL LENGTH OF WINDING DIFFERENTIAL LINES, AND DEVICE AND STORAGE MEDIUM

(71) Applicant: INSPUR SUZHOU INTELLIGENT TECHNOLOGY CO., LTD., Jiangsu (CN)

(72) Inventors: Danping Guo, Jiangsu (CN); Yao Meng, Jiangsu (CN); Tongjuan Yao, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/268,954

(22) PCT Filed: Oct. 29, 2021

(86) PCT No.: PCT/CN2021/127317
§ 371 (c)(1),
(2) Date: Jun. 21, 2023

(87) PCT Pub. No.: WO2023/024245
PCT Pub. Date: Mar. 2, 2023

(30) Foreign Application Priority Data

Aug. 25, 2021 (CN) .......................... 202110978212.7

(51) Int. Cl.
*G06F 30/398* (2020.01)
*G06F 115/12* (2020.01)

(52) U.S. Cl.
CPC ........ *G06F 30/398* (2020.01); *G06F 2115/12* (2020.01)

(58) Field of Classification Search
CPC .... G06F 18/2178; G06F 18/217; G06F 18/21; G06F 18/25; G06F 17/18; G06F 16/2477;
(Continued)

(56) References Cited

U.S. PATENT DOCUMENTS

2006/0190902 A1 8/2006 Shirai
2015/0162113 A1 6/2015 Ishikawa et al.
(Continued)

FOREIGN PATENT DOCUMENTS

CN 108124375 A 6/2018
CN 109379832 A 2/2019
(Continued)

OTHER PUBLICATIONS

Zhangping Yang. "Isometric Processing of Differential Lines and Simulation Verification in High-Speed PCB Design." Communication Technology, 48(5), May 2015.
Kuang, Weidong, et al. "Design of asynchronous circuits for high soft error tolerance in deep submicrometer CMOS circuits." IEEE transactions on very large scale integration (VLSI) systems 18.3 (2009): 410-422.

*Primary Examiner* — Binh C Tat
(74) *Attorney, Agent, or Firm* — IPro, PLLC

(57) ABSTRACT

The present application discloses a method for calculating equal lengths of wound differential wires, wherein the method includes: calculating total lengths of a P differential wire and an N differential wire of a to-be-wound-with-equal-lengths target differential-wire pair; according to the total lengths of the P differential wire and the N differential wire, calculating a differential-wire length difference between the P and N differential wires, and determining the one having a lower total length as a target differential wire; acquiring a distance between the P differential wire and the N differential wire, and using the distance as a protruding height; acquiring a preset protruding angle, and calculating the protruding height and the protruding angle according to a first calculating relation, to obtain a length added by one
(Continued)

protruding; and according to the differential-wire length difference and the length added by one protruding, calculating a total quantity of protrudings.

17 Claims, 5 Drawing Sheets

(58) Field of Classification Search
CPC .............. G06F 18/00; G06F 2211/005; G06F 2218/00; G06F 16/2379; G06F 16/24; G06F 16/245; G06F 3/0219; G06F 3/0233; G06F 3/0237; G06F 3/0238; G06F 18/213
USPC .................................................. 716/136–139
See application file for complete search history.

(56) References Cited

U.S. PATENT DOCUMENTS

| 2016/0220391 | A1* | 8/2016 | Duval .................. A61B 5/6838 |
| 2019/0154439 | A1* | 5/2019 | Binder .................. G01B 11/26 |

FOREIGN PATENT DOCUMENTS

| CN | 111046626 A | 4/2020 |
| CN | 111859847 A | 10/2020 |
| CN | 113011123 A | 6/2021 |
| CN | 113420527 A | 9/2021 |

\* cited by examiner

| | A | B |
|---|---|---|
| 1 | PIN DELAY | |
| 2 | pin number | Length(mil) |
| 3 | J*.A1 | 982.692 |
| 4 | J*.B1 | 991.454 |
| 5 | J*.C1 | 1164.672 |
| 6 | J*.D1 | 1155.236 |
| 7 | J*.E1 | 1279.8 |
| 8 | J*.F1 | 1270.952 |

|   | A | B | C | D | E |
|---|---|---|---|---|---|
| 1 | net name | PCB length(mil) | pin number1 | pin number2 | pin numberN |
| 2 | PCIE_TX_DN0 | 1000 | J1*.A1 | J2*.A1 | J3*.A1 |
| 3 | PCIE_TX_DN1 | | | | |
| 4 | PCIE_TX_DN2 | | | | |
| 5 | PCIE_TX_DN3 | | | | |
| 6 | PCIE_TX_DN4 | | | | |
| 7 | PCIE_TX_DP0 | | | | |
| 8 | PCIE_TX_DP1 | | | | |
| 9 | PCIE_TX_DP2 | | | | |
| 10 | PCIE_TX_DP3 | | | | |
| 11 | PCIE_TX_DP4 | | | | |

| A | B | C | D | E | F |
|---|---|---|---|---|---|
| net name | PCB length (mil) | pin delay1 (mil) | pin delay2 (mil) | pin delayN (mil) | total length (mil) |
| PCIE_TX_DN0 | 1000 | | | | |
| PCIE_TX_DN1 | | | | | |
| PCIE_TX_DN2 | | | | | |
| PCIE_TX_DN3 | | | | | |
| PCIE_TX_DN4 | | | | | |
| PCIE_TX_DP0 | | | | | |
| PCIE_TX_DP1 | | | | | |
| PCIE_TX_DP2 | | | | | |
| PCIE_TX_DP3 | | | | | |
| PCIE_TX_DP4 | | | | | | though excessively. The present application claims the priority of the Chinese patent application filed on Aug. 25, 2021 before the Chinese Patent Office with the application number of 202110978212.7 and the title of "METHOD AND APPARATUS FOR CALCULATING EQUAL LENGTH OF WINDING DIFFERENTIAL LINES, AND DEVICE AND STORAGE MEDIUM", which is incorporated herein in its entirety by reference.

METHOD AND APPARATUS FOR CALCULATING EQUAL LENGTH OF WINDING DIFFERENTIAL LINES, AND DEVICE AND STORAGE MEDIUM

CROSS REFERENCE TO RELATED APPLICATION

The present application claims the priority of the Chinese patent application filed on Aug. 25, 2021 before the Chinese Patent Office with the application number of 202110978212.7 and the title of "METHOD AND APPARATUS FOR CALCULATING EQUAL LENGTH OF WINDING DIFFERENTIAL LINES, AND DEVICE AND STORAGE MEDIUM", which is incorporated herein in its entirety by reference.

TECHNICAL FIELD

The present application relates to a method and apparatus for calculating equal lengths of wound differential wires, a device and a computer-readable storage medium.

BACKGROUND

Differential signals are being applied increasingly more extensively in the design of high-speed circuits, and usually all of the most critical signals in the circuits are required to employ the differential structure. The most obvious advantages of differential signals, as compared with common single-terminal signal wiring, have the following three aspects: a high anti-interference performance, capability of effectively inhibiting EMI (Electro Magnetic Interference), and precise time-sequence locating.

For PCB (Printed Circuit Board) engineers, in order to ensure that the actual wiring can completely exploit those advantages of the differential wiring, it is required to cause the differential wires to have equal lengths. The equal lengths are in order to ensure that the two differential signals maintain the opposite polarities at any moment, to reduce the common-mode component. However, the inventor has envisaged that both of the difference in the part Pin Delay and the wiring corners cause unequal lengths of the differential wires N and P, as shown in FIG. 1. In order to solve that problem, usually one-wire protruding is performed to the shorter wire to satisfy the matched equal lengths of N and P. Sometimes the N and P wires have a high difference in the lengths therebetween, and therefore it is required to make particularly many protrudings in the shorter wire. The quantity of the required protrudings is artificially and manually adjusted, which results in repeated working and unevenness of the protruding heights. For a main control panel for storage, in one mainboard approximately more than 1000 pairs of the differential wires require to be adjusted manually to have equal lengths, which results in a large workload of the working personnel.

SUMMARY

An embodiment of the present application provides a method for calculating equal lengths of wound differential wires, wherein the method comprises:

calculating a total length of a P differential wire and a total length of an N differential wire of a to-be-wound-with-equal-lengths target differential-wire pair;

according to the total length of the P differential wire and the total length of the N differential wire, calculating a differential-wire length difference between the P differential wire and the N differential wire, and determining the one having a lower total length of the P differential wire and the N differential wire as a target differential wire;

acquiring a distance between the P differential wire and the N differential wire, and using the distance as a protruding height of a protruding;

acquiring a preset protruding angle of the protruding, and calculating the protruding height and the protruding angle according to a first calculating relation, to obtain a length added by one protruding, wherein the first calculating relation is:

L=2*(h/sinB−h/tanB), wherein L represents the length added by one protruding, h represents the protruding height, and B represents the protruding angle; and according to the differential-wire length difference and the length added by one protruding, calculating a total quantity of protrudings in the target differential wire.

An embodiment of the present application further provides an apparatus for calculating equal lengths of wound differential wires, wherein the apparatus comprises:

a length calculating module configured for calculating a total length of a P differential wire and a total length of an N differential wire of a to-be-wound-with-equal-lengths target differential-wire pair;

a difference calculating module configured for, according to the total length of the P differential wire and the total length of the N differential wire, calculating a differential-wire length difference between the P differential wire and the N differential wire, and determining the one having a lower total length of the P differential wire and the N differential wire as a target differential wire;

an acquiring module configured for acquiring a distance between the P differential wire and the N differential wire, and using the distance as a protruding height of a protruding;

an increment calculating module configured for acquiring a preset protruding angle of the protruding, and calculating the protruding height and the protruding angle according to a first calculating relation, to obtain a length added by one protruding, wherein the first calculating relation is:

L=2*(h/sinB−h/tanB), wherein L represents the length added by one protruding, h represents the protruding height, and B represents the protruding angle; and a quantity calculating module configured for, according to the differential-wire length difference and the length added by one protruding, calculating a total quantity of protrudings in the target differential wire.

An embodiment of the present application further provides a computer device, wherein the computer device comprises a memory and one or more processors, the memory stores a computer-readable instruction, and the computer-readable instruction, when executed by the one or more processors, causes the one or more processors to implement the steps of the method for calculating equal lengths of wound differential wires according to any one of the above embodiments.

An embodiment of the present application further provides one or more non-volatile computer-readable storage mediums storing a computer-readable instruction, wherein the computer-readable instruction, when executed by one or more processors, causes the one or more processors to implement the steps of the method for calculating equal lengths of wound differential wires according to any one of the above embodiments.

The details of one or more embodiments of the present application are provided in the following drawings and description. The other characteristics and advantages of the present application will become apparent from the description, the drawings and the claims.

BRIEF DESCRIPTION OF THE DRAWINGS

In order to more clearly illustrate the technical solutions of the embodiments of the present application, the figures that are required to describe the prior art and the embodiments will be briefly described below. Apparently, the figures that are described below are merely embodiments of the present application, and a person skilled in the art can obtain other figures according to these figures without paying creative work.

DETAILED DESCRIPTION

An embodiment of the present application provides a method for calculating equal lengths of wound differential wires, which in usage can automatically calculate the total quantity of the formed protrudings in the target differential wire, which reduces the workload of the working personnel, and increases the calculation accuracy, the calculation efficiency and the overall working efficiency.

In order to make the objects, the technical solutions and the advantages of the embodiments of the present application clearer, the technical solutions according to the embodiments of the present application will be clearly and completely described below with reference to the drawings according to the embodiments of the present application. Apparently, the described embodiments are merely certain embodiments of the present application, rather than all of the embodiments. All of the other embodiments that a person skilled in the art obtains on the basis of the embodiments of the present application without paying creative work fall within the protection scope of the present application.

Figure 1:
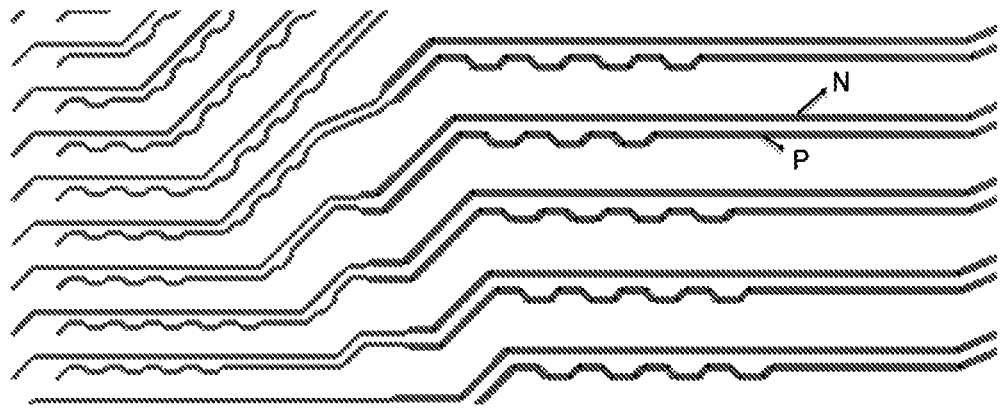
FIG. 1 is a schematic diagram of a differential-wire structure in the prior art.
Figure 2:
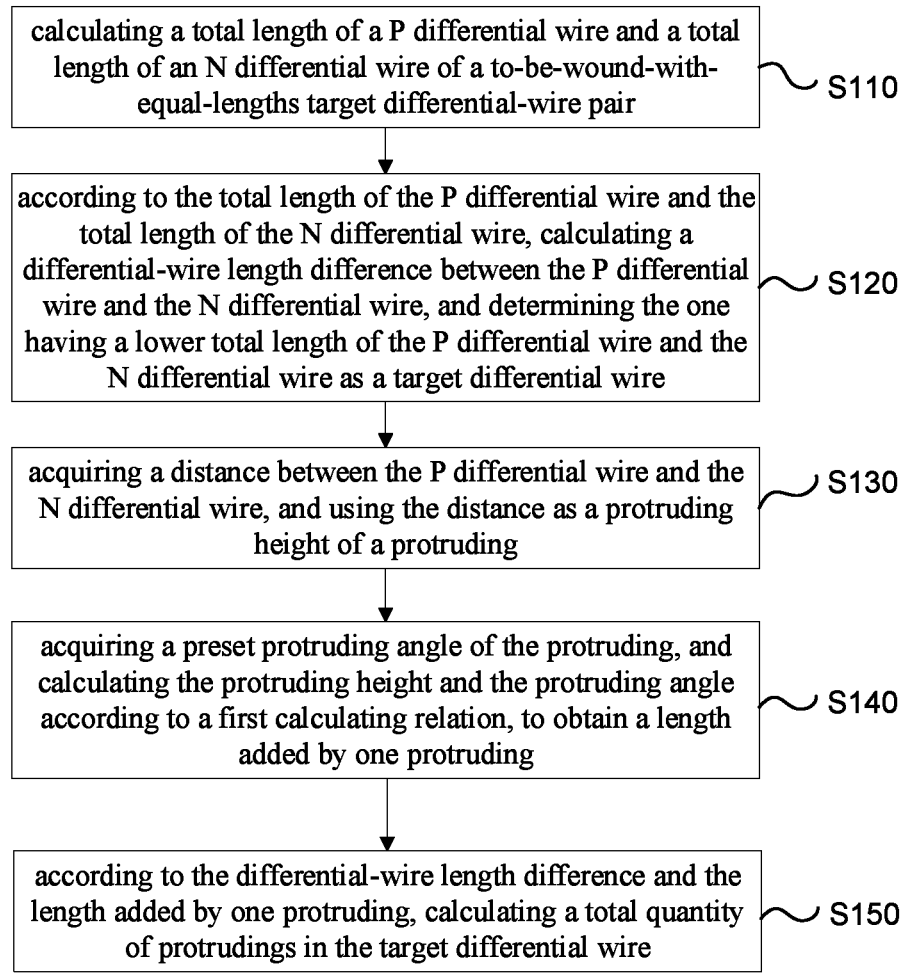
FIG. 2 is a schematic flow chart of the method for calculating equal lengths of wound differential wires according to one or more embodiments of the present application.

Referring to FIG. 2, FIG. 2 is a schematic flow chart of the method for calculating equal lengths of wound differential wires according to an embodiment of the present application. The subject of the implementation of the method for calculating equal lengths of wound differential wires may be a server, and may also be a terminal. The method comprises:

S110: calculating a total length of a P differential wire and a total length of an N differential wire of a to-be-wound-with-equal-lengths target differential-wire pair.

It should be noted that this step may particularly comprise receiving a wound-with-equal-lengths selecting instruction from the user, determining the target differential-wire pair according to the wound-with-equal-lengths selecting instruction, wherein the target differential-wire pair comprises a P differential wire and a corresponding N differential wire, and calculating the total length of the P differential wire and the total length of the N differential wire.

S120: according to the total length of the P differential wire and the total length of the N differential wire, calculating a differential-wire length difference between the P differential wire and the N differential wire, and determining the one having a lower total length of the P differential wire and the N differential wire as a target differential wire.

Particularly, after the total length of the P differential wire and the total length of the N differential wire are obtained, this step may comprise, according to the total length of the P differential wire and the total length of the N differential wire, determining the shorter differential wire of them as the target differential wire, i.e., the differential wire requiring protruding, and calculating the differential-wire length difference between the two differential wires.

S130: acquiring a distance between the P differential wire and the N differential wire, and using the distance as a protruding height of a protruding.

S140: acquiring a preset protruding angle of the protruding, and calculating the protruding height and the protruding angle according to a first calculating relation, to obtain a length added by one protruding, wherein the first calculating relation is:

$L=2*(h/\sin B - h/\tan B)$, wherein L represents the length added by one protruding, h represents the protruding height, and B represents the protruding angle.

Particularly, the length added by one protruding according to the embodiments of the present application refers to the length that is added by forming one protruding as compared with the state of a straight line of the wire. Because it is required to finally cause the target differential wire after the protruding to have the equal length to that of the other differential wire, in the embodiments of the present application the length added by forming one protruding can be calculated.

Figure 3:
FIG. 3 is a schematic structural diagram of differential wires according to one or more embodiments of the present application before protruding.
Figure 4:
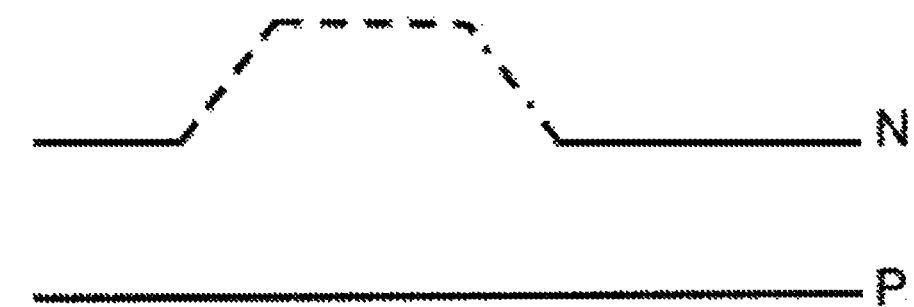
FIG. 4 is a schematic structural diagram after one-wire protruding of the N differential wire in FIG. 3.
Figure 5:
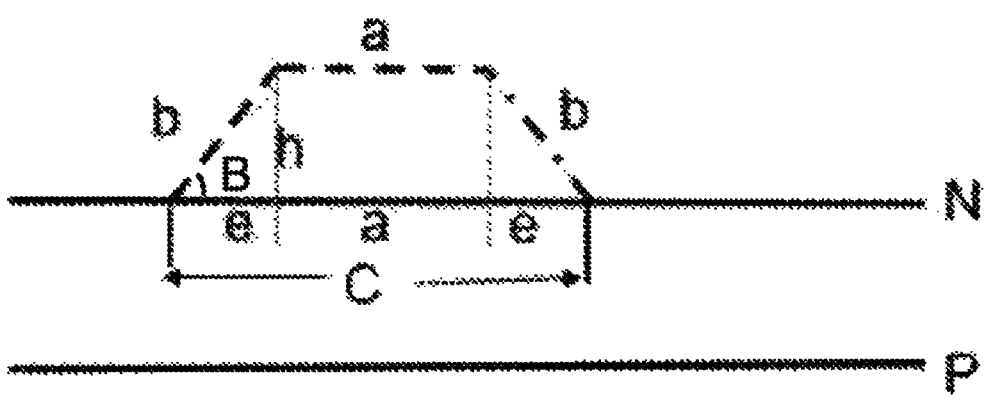
FIG. 5 is a schematic diagram of the mode for calculating the length added by forming one protruding.

Particularly, referring to FIGS. 3 to 5, for example, by one-wire protruding to the N differential wire in FIG. 3, the differential wires shown in FIG. 4 can be obtained. The length added in the N differential wire in FIG. 4 as compared with the N differential wire in FIG. 3 may be obtained from FIG. 5, wherein the length added by forming one protruding is $L=a+b+b-(a+e+e)=2*(b-e)$, the quantity of the formed protrudings may be obtained by (the total length of the P differential wire-the total length of the N differential wire)/L, and a may be the length of the upper bottom of the trapezoid of the formed protruding. Further, because both of b and e are related to h, wherein h is the rigidity of the formed protruding, the angle of the single protruding may be expressed as B, and therefore $b=h/\sin B$, $e=h/\tan B$ and $L=a+b+b-(a+e+e)=2*(b-e)$, whereby it can be obtained and defined that the calculating relation is $L=2*(h/\sin B-h/\tan B)$. In practical applications, according to the chip manual, it can be known that the requirement on h is that h be equal to the distance between the P differential wire and the N differential wire of the target differential-wire pair. The protruding angle B may be determined according to practical demands, for example, 45° or 10°.

S150: according to the differential-wire length difference and the length added by one protruding, calculating a total quantity of protrudings in the target differential wire.

Particularly, because the differential-wire length difference between the two differential wires and the length added by one protruding have already been obtained by calculation, further, the total quantity of the required protrudings may be obtained according to the differential-wire length difference and the length added by one protruding. Particularly, the total quantity of the formed protrudings may be obtained by dividing the differential-wire length difference by the length added by one protruding, and the total quantity of the formed protrudings and the target differential wire may be correspondingly stored, whereby the working personnel, according to the stored data, knows that it is required to perform protruding to the target differential wire. Furthermore, the total quantity of the required protrudings can be known, which greatly increases the calculation efficiency and the working efficiency.

Figures 6, 7:
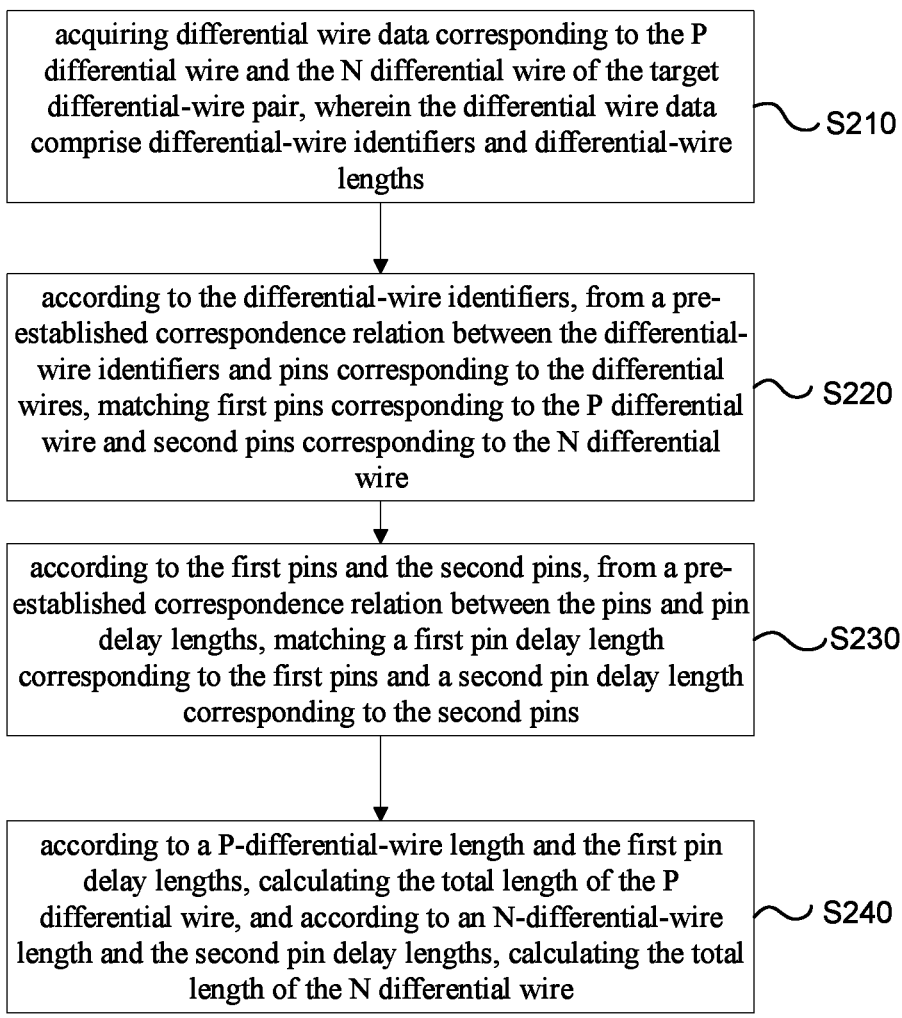
FIG. 6 is a schematic flow chart of the method for calculating the total lengths of the differential wires according to one or more embodiments of the present application.
FIG. 7 is a schematic diagram of a table of the correspondence relation between the pin numbers and the pin delay lengths according to one or more embodiments of the present application.

Optionally, referring to FIG. 6, in S110, the step of calculating the total length of the P differential wire and the total length of the N differential wire of the to-be-wound-with-equal-lengths target differential-wire pair may particularly comprise:

S210: acquiring differential wire data corresponding to the P differential wire and the N differential wire of the target differential-wire pair, wherein the differential wire data comprise differential-wire identifiers and differential-wire lengths.

It should be noted that, usually, the length of a differential wire consists of the lengths of the chips connected by its entirely net, the pin delay of a connector and a PCB board. In the embodiment of the present application, a correspondence relation may be established in advance between the differential-wire identifiers and the pins corresponding to the differential wires. In other words, each of the differential wires is allocated with one unique identifier, and the pins corresponding to each of the unique identifiers. For example, the unique identifier of the differential wire may employ a unique net name, and the pin numbers of the pins corresponding to the net name. Because, generally, the part pins have wiring therein, and the lengths of the N and P pin wiring are unequal, when the length of the signal wire on the PCB board is calculated, the lengths of the pin delays are added. In order to compensate for the internal part pin delays, usually compensation is added to the PCB. Furthermore, in the embodiment of the present application, the pre-established correspondence relation between the pins and the pin delay lengths may particularly be the correspondence relation between the pin identifiers and the pin delay lengths, for example, the correspondence relation between the pin numbers and the pin delay lengths, wherein the unit of the pin delay lengths is mil (the mil refers to one-thousandth inch, and 1 mil=0.0254 mm), which may particularly be established in the form of a correspondence-relation table, as shown in FIG. 7.

Particularly, after the target differential-wire pair is acquired, the P-differential-wire data corresponding to the P differential wire of the target differential-wire pair are acquired, wherein the differential wire data of the P differential wire may comprise a P-differential-wire identifier and a P-differential-wire length, and the N-differential-wire data corresponding to the N differential wire of the target differential-wire pair are acquired, wherein the differential wire data of the N differential wire may comprise an N-differential-wire identifier and an N-differential-wire length. In practical applications, that may be performed by receiving the differential wire data of the target differential-wire pair inputted by the user, and subsequently extracting the corresponding differential-wire identifiers and differential-wire lengths from the differential wire data.

S220: according to the differential-wire identifiers, from a pre-established correspondence relation between the differential-wire identifiers and pins corresponding to the differential wires, matching first pins corresponding to the P differential wire and second pins corresponding to the N differential wire.

Particularly, this step may comprise, according to the P-differential-wire identifier, from the correspondence relation between the differential-wire identifiers and the pins corresponding to the differential wires, matching the first pins corresponding to the P differential wire, thereby determining the pins of all of the parts that the P differential wire passes through (whereby, particularly, the pin numbers can be obtained), and according to the N-differential-wire identifier, from the correspondence relation between the differential-wire identifiers and the pins corresponding to the differential wires, matching the second pins corresponding to the N differential wire. Certainly, in practical applications, this step may also comprise, directly according to the differential-wire data derived directly from the PCB files, including the differential-wire identifiers, the differential-wire lengths and the data of the pin numbers corresponding to the differential wires, according to the table format shown in FIG. 8, performing storage recording, to determine the first pins and the second pins, thereby determining the pins of all of the parts that the N differential wire passes through (whereby, particularly, the pin numbers can be obtained).

S230: according to the first pins and the second pins, from a pre-established correspondence relation between the pins and pin delay lengths, matching a first pin delay length corresponding to the first pins and a second pin delay length corresponding to the second pins.

Particularly, this step may comprise, according to the identifiers of each of the pins, from the established correspondence relation between the pin identifiers and the pin delay lengths, matching the first pin delay lengths and the second pin delay lengths.

S240: according to a P-differential-wire length and the first pin delay lengths, calculating the total length of the P differential wire, and according to an N-differential-wire length and the second pin delay lengths, calculating the total length of the N differential wire.

Figures 8, 9, 10:
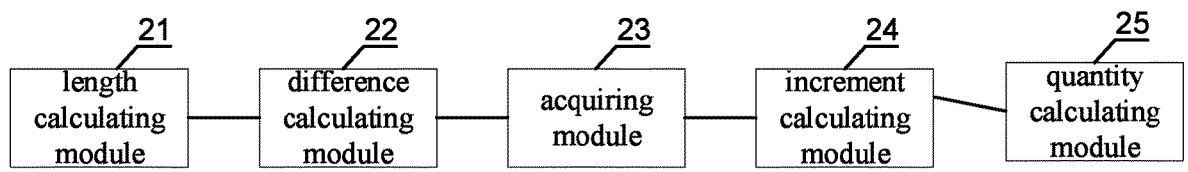
FIG. 8 is a schematic diagram of a table of the differential-wire data according to one or more embodiments of the present application.
FIG. 9 is a schematic diagram of a table for calculating the total lengths of the differential wires according to one or more embodiments of the present application.
FIG. 10 is a schematic structural diagram of the apparatus for calculating equal lengths of wound differential wires according to one or more embodiments of the present application.

Particularly, this step may comprise, according to the table shown in FIG. 9, for each of the differential wires, calculating the differential-wire length (PBC length), and the sum of the pin delay lengths (pin delays) of the corresponding pins, to obtain the total length of the differential wire (Total length).

Further optionally, in order to facilitate the user to know the treatment result in time, the method may further comprise:

emphatically displaying the target differential wire, and displaying the total quantity of the formed protrudings corresponding to the target differential wire. Particularly, this step may comprise, in a wiring diagram, in the form of highlighting, highlight-displaying the target differential wire that requires protruding, to emphatically display the target differential wire, to enable the working personnel to quickly identify the target differential wire, and further displaying the total quantity of the formed protrudings corresponding to the target differential wire. Particularly, the total quantity of the formed protrudings may be displayed at a preset distance adjacently to the target differential wire, whereby the working personnel performs the protruding treatment to the target differential wire according to the total quantity of the formed protrudings, to increase the treatment speed and working efficiency.

It can be seen that the embodiments of the present application comprise, regarding the to-be-wound-with-equal-lengths target differential-wire pair, firstly calculating the total length of the P differential wire and the total length of the N differential wire; subsequently, further calculating the differential-wire length difference between the two differential wires, and determining the one having the lower total length of the P differential wire and the N differential wire as the target differential wire; according to the protruding height and the protruding angle of the protruding, calculating the length added by one protruding, particularly by using the distance between the P differential wire and the N differential wire as the protruding height; acquiring a preset protruding angle, and calculating the protruding height and the protruding angle according to a first calculating relation, to obtain the length added by one protruding, wherein the first calculating relation is: $L=2*(h/\sin B - h/\tan B)$, wherein L represents the length added by one protruding, h represents the protruding height, and B represents the protruding angle; and, subsequently, according to the differential-wire length difference and the length of the single protruding, further calculating the total quantity of the formed protrudings that are required in the target differential wire. The present application can automatically calculate the total quantity of the formed protrudings in the target differential wire, which reduces the workload of the working personnel, and increases the calculation accuracy, the calculation efficiency and the overall working efficiency.

On the basis of the above embodiments, an embodiment of the present application further provides an apparatus for calculating equal lengths of wound differential wires, which may particularly refer to FIG. 10. The apparatus comprises:

a length calculating module 21 configured for calculating a total length of a P differential wire and a total length of an N differential wire of a to-be-wound-with-equal-lengths target differential-wire pair;

a difference calculating module 22 configured for, according to the total length of the P differential wire and the total length of the N differential wire, calculating a differential-wire length difference between the P differential wire and the N differential wire, and determining the one having a lower total length of the P differential wire and the N differential wire as a target differential wire;

an acquiring module 23 configured for acquiring a distance between the P differential wire and the N differential wire, and using the distance as a protruding height of a protruding;

an increment calculating module 24 configured for acquiring a preset protruding angle of the protruding, and calculating the protruding height and the protruding angle according to a first calculating relation, to obtain a length added by one protruding, wherein the first calculating relation is: $L=2*(h/\sin B - h/\tan B)$, wherein L represents the length added by one protruding, h represents the protruding height, and B represents the protruding angle; and a quantity calculating module 25 configured for, according to the differential-wire length difference and the length added by one protruding, calculating a total quantity of protrudings in the target differential wire.

Optionally, the length calculating module 21 comprises:

a first acquiring unit configured for acquiring differential wire data corresponding to the P differential wire and the N differential wire of the target differential-wire pair, wherein the differential wire data comprise differential-wire identifiers and differential-wire lengths;

a first matching unit configured for, according to the differential-wire identifiers, from a pre-established correspondence relation between the differential-wire identifiers and pins corresponding to the differential wires, matching first pins corresponding to the P differential wire and second pins corresponding to the N differential wire;

a second matching unit configured for, according to the first pins and the second pins, from a pre-established correspondence relation between the pins and pin delay lengths, matching a first pin delay length corresponding to the first pins and a second pin delay length corresponding to the second pins; and a length calculating unit configured for, according to a P-differential-wire length and the first pin delay lengths, calculating the total length of the P differential wire, and according to an N-differential-wire length and the second pin delay lengths, calculating the total length of the N differential wire.

It should be noted that the apparatus for calculating equal lengths of wound differential wires according to the embodiments of the present application has the advantageous effects the same as those of the method for calculating equal lengths of wound differential wires according to the above embodiments, and the particular description on the method for calculating equal lengths of wound differential wires according to the embodiments of the present application may refer to the above embodiments, and is not discussed further in the present application.

On the basis of the above embodiments, an embodiment of the present application further provides a computer device, wherein the computer device comprises a memory and one or more processors, the memory stores a computer-readable instruction, and the computer-readable instruction, when executed by the one or more processors, causes the one or more processors to implement the steps of the method for calculating equal lengths of wound differential wires according to any one of the above embodiments.

For example, the processor according to the embodiment of the present application may be configured for implementing calculating a total length of a P differential wire and a total length of an N differential wire of a to-be-wound-with-equal-lengths target differential-wire pair; according to the total length of the P differential wire and the total length of the N differential wire, calculating a differential-wire length difference between the P differential wire and the N differential wire, and determining the one having a lower total length of the P differential wire and the N differential wire as a target differential wire; acquiring a distance between the P differential wire and the N differential wire, and using the distance as a protruding height of a protruding; acquiring a preset protruding angle of the protruding, and calculating the protruding height and the protruding angle according to a first calculating relation, to obtain a length added by one protruding, wherein the first calculating relation is: $L=2*(h/$ sinB−h/tanB), wherein L represents the length added by one protruding, h represents the protruding height, and B represents the protruding angle; and according to the differential-wire length difference and the length added by one protruding, calculating a total quantity of protrudings in the target differential wire.

On the basis of the above embodiments, an embodiment of the present application further provides one or more non-volatile computer-readable storage mediums storing a computer-readable instruction, wherein the computer-readable instruction, when executed by one or more processors, causes the one or more processors to implement the steps of the method for calculating equal lengths of wound differential wires according to any one of the above embodiments.

Each of devices according to the embodiments of the disclosure can be implemented by hardware, or implemented by software modules operating on one or more processors, or implemented by the combination thereof. A person skilled in the art should understand that, in practice, a microprocessor or a digital signal processor (DSP) may be used to realize some or all of the functions of some or all of the modules in the device according to the embodiments of the disclosure. The disclosure may further be implemented as device program (for example, computer program and computer program product) for executing some or all of the methods as described herein. Such program for implementing the disclosure may be stored in the computer readable medium, or have a form of one or more signals. Such a signal may be downloaded from the interne websites, or be provided in carrier, or be provided in other manners.

Figure 11:
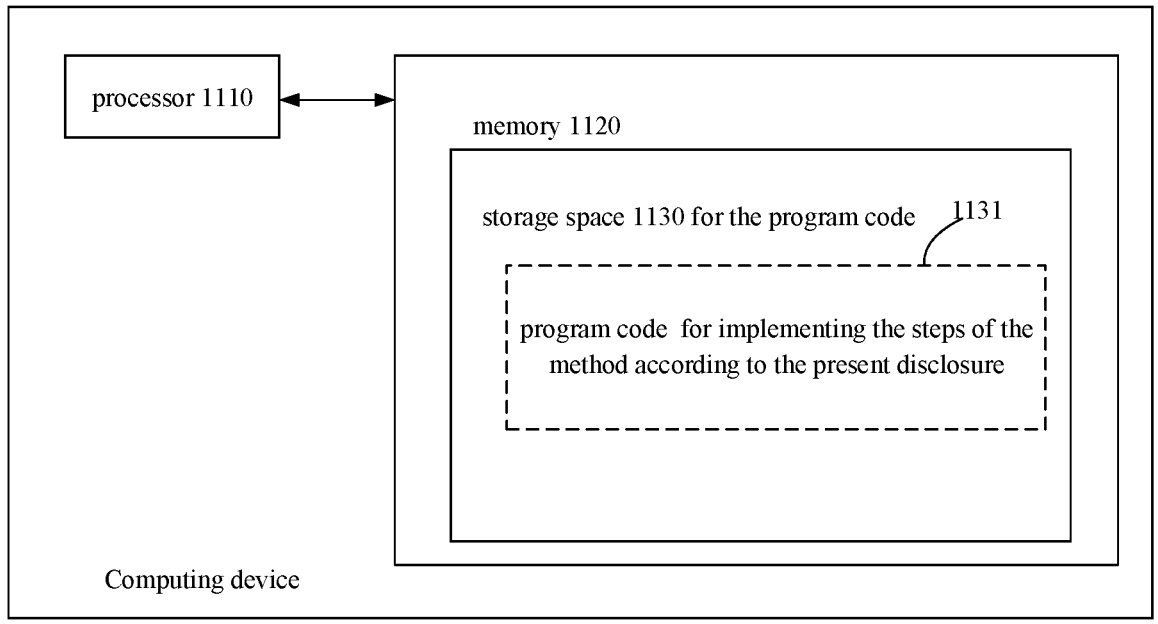
FIG. 11 is a block diagram showing a computing device for executing the method for calculating equal lengths of wound differential wires according to the disclosure.
Figure 12:
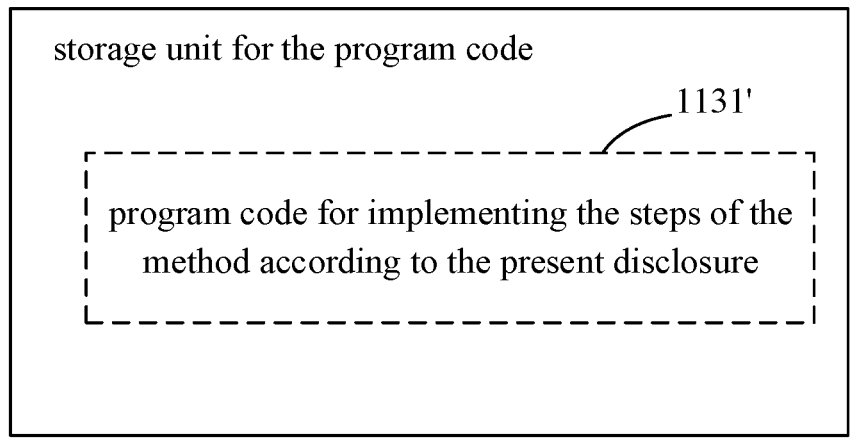
FIG. 12 is a block diagram showing storage unit for storing the program code for implementing the steps of the method according to the present disclosure.

For example, FIG. 11 illustrates a block diagram of a computing device for executing the method according the disclosure. Traditionally, the computing device includes a processor 1110 and a computer program product or a computer readable medium in form of a memory 1120. The memory 1120 could be electronic memories such as flash memory, EEPROM (Electrically Erasable Programmable Read-Only Memory), EPROM, hard disk or ROM. The memory 1120 has a memory space 1130 for executing program codes 1131 of any steps in the above methods. For example, the memory space 1130 for program codes may include respective program codes 1131 for implementing the respective steps in the method as mentioned above. These program codes may be read from and/or be written into one or more computer program products. These computer program products include program code carriers such as hard disk, compact disk (CD), memory card or floppy disk. These computer program products are usually the portable or stable memory cells as shown in reference FIG. 12. The memory cells may be provided with memory sections, memory spaces, etc., similar to the memory 1120 of the server as shown in FIG. 11. The program codes may be compressed for example in an appropriate form. Usually, the memory cell includes computer readable codes 1131' which can be read for example by processors 1110. When these codes are operated on the server, the server may execute respective steps in the method as described above.

The computer-readable storage medium may comprise various media that can store a program code, such as a USB flash disk, a mobile hard disk drive, a Read-Only Memory (ROM), a Random Access Memory (RAM), a diskette and an optical disk.

The embodiments of the description are described in the mode of progression, each of the embodiments emphatically describes the differences from the other embodiments, and the same or similar parts of the embodiments may refer to each other. Regarding the devices according to the embodiments, because they correspond to the methods according to the embodiments, they are described simply, and the relevant parts may refer to the description on the methods.

It should also be noted that, in the description, relation terms such as first and second are merely intended to distinguish one entity or operation from another entity or operation, and that does not necessarily require or imply that those entities or operations have therebetween any such actual relation or order. Furthermore, the terms "include", "comprise" or any variants thereof are intended to cover non-exclusive inclusions, so that processes, methods, articles or devices that include a series of elements do not only include those elements, but also include other elements that are not explicitly listed, or include the elements that are inherent to such processes, methods, articles or devices. Unless further limitation is set forth, an element defined by the wording "comprising a . . . " does not exclude additional same element in the process, method, article or device comprising the element.

The above description on the disclosed embodiments enables a person skilled in the art to implement or use the present application. Various modifications on those embodiments will be apparent to a person skilled in the art, and the general principle defined herein may be implemented in other embodiments without departing from the spirit or scope of the present application. Therefore, the present application should not be limited to the embodiments illustrated herein, but should meet the broadest scope in accord with the principle and the novel characteristics disclosed herein.

The invention claimed is:

1. A method for calculating equal lengths of wound differential wires, wherein the method comprises:
    calculating a total length of a P differential wire and a total length of an N differential wire of a to-be-wound-with-equal-lengths target differential-wire pair;
    according to the total length of the P differential wire and the total length of the N differential wire, calculating a differential-wire length difference between the P differential wire and the N differential wire, and determining the one having a lower total length of the P differential wire and the N differential wire as a target differential wire;
    acquiring a distance between the P differential wire and the N differential wire, and using the distance as a protruding height of a protruding;
    acquiring a preset protruding angle of the protruding, and calculating the protruding height and the preset protruding angle according to a first calculating relation, to obtain a length added by one protruding, wherein the first calculating relation is:
    L=2*(h/sinB−h/tanB), wherein L represents the length added by one protruding, h represents the protruding height, and B represents the protruding angle; and
    according to the differential-wire length difference and the length added by one protruding, calculating a total quantity of protrudings in the target differential wire;
    wherein the step of calculating the total length of the P differential wire and the total length of the N differential wire of the to-be-wound-with-equal-lengths target differential-wire pair comprises:
        acquiring differential wire data corresponding to the P differential wire and the N differential wire of the target differential-wire pair, wherein the differential wire data comprise differential-wire identifiers and differential-wire lengths;

according to the differential-wire identifiers, from a pre-established correspondence relation between the differential-wire identifiers and pins corresponding to the differential wires, matching first pins corresponding to the P differential wire and second pins corresponding to the N differential wire;

according to the first pins and the second pins, from a pre-established correspondence relation between the pins and pin delay lengths, matching a first pin delay length corresponding to the first pins and a second pin delay length corresponding to the second pins; and according to a P-differential-wire length and the first pin delay lengths, calculating the total length of the P differential wire, and according to an N-differential-wire length and the second pin delay lengths, calculating the total length of the N differential wire.

2. The method for calculating equal lengths of wound differential wires according to claim 1, wherein the method further comprises:

emphatically displaying the target differential wire, and displaying the total quantity of the formed protrudings corresponding to the target differential wire.

3. The method for calculating equal lengths of wound differential wires according to claim 1, wherein the protruding is formed by at least two connected segments of straight wires, the at least two connected segments of straight wires are symmetrical to each other.

4. The method for calculating equal lengths of wound differential wires according to claim 1, wherein the protruding is formed by three connected segments of straight wires, the three connected segments of straight wires form a symmetrical shape that protrudes from the target differential wire.

5. The method for calculating equal lengths of wound differential wires according to claim 1, wherein the protruding is formed by a plurality of connected segments of straight wires, the plurality of connected segments of straight wires form a symmetrical shape that protrudes from the target differential wire.

6. The method for calculating equal lengths of wound differential wires according to claim 1, wherein the length of either of the P differential wire and the N differential wire consists of the lengths of a chips connected by its entirely net, the pin delay of a connector and a PCB board.

7. A computer device, wherein the computer device comprises a memory and one or more processors, the memory stores a computer-readable instruction, and the computer-readable instruction, when executed by the one or more processors, causes the one or more processors to implement the steps of the method according to claim 1.

8. The computing device according to claim 7, wherein the operations further comprise:

emphatically displaying the target differential wire, and displaying the total quantity of the formed protrudings corresponding to the target differential wire.

9. The computing device according to claim 7, wherein the protruding is formed by at least two connected segments of straight wires, the at least two connected segments of straight wires are symmetrical to each other.

10. The computing device according to claim 7, wherein the protruding is formed by three connected segments of straight wires, the three connected segments of straight wires form a symmetrical shape that protrudes from the target differential wire.

11. The computing device according to claim 7, wherein the protruding is formed by a plurality of connected segments of straight wires, the plurality of connected segments of straight wires form a symmetrical shape that protrudes from the target differential wire.

12. The computing device according to claim 7, wherein the length of either of the P differential wire and the N differential wire consists of the lengths of a chips connected by its entirely net, the pin delay of a connector and a PCB board.

13. One or more non-volatile computer-readable storage mediums storing a computer-readable instruction, wherein the computer-readable instruction, when executed by one or more processors, causes the one or more processors to implement the steps of the method according to claim 1.

14. The one or more non-volatile computer-readable storage mediums storing a computer-readable instruction according to claim 13, wherein the operations further comprise:

emphatically displaying the target differential wire, and displaying the total quantity of the formed protrudings corresponding to the target differential wire.

15. The one or more non-volatile computer-readable storage mediums storing a computer-readable instruction according to claim 13, wherein the protruding is formed by at least two connected segments of straight wires, the at least two connected segments of straight wires are symmetrical to each other.

16. The one or more non-volatile computer-readable storage mediums storing a computer-readable instruction according to claim 13, wherein the protruding is formed by three connected segments of straight wires, the three connected segments of straight wires form a symmetrical shape that protrudes from the target differential wire.

17. The one or more non-volatile computer-readable storage mediums storing a computer-readable instruction according to claim 13, wherein the length of either of the P differential wire and the N differential wire consists of the lengths of a chips connected by its entirely net, the pin delay of a connector and a PCB board.

* * * * *